Patented Aug. 7, 1923.

1,463,959

UNITED STATES PATENT OFFICE.

BETHUNE G. KLUGH, OF ANNISTON, ALABAMA, ASSIGNOR TO FEDERAL PHOSPHORUS COMPANY, OF BIRMINGHAM, ALABAMA, A CORPORATION OF ALABAMA.

PROCESS FOR OXIDIZING PHOSPHORUS.

No Drawing. Application filed June 14, 1920, Serial No. 388,821. Renewed October 7, 1922. Serial No. 593,142.

*To all whom it may concern:*

Be it known that I, BETHUNE G. KLUGH, a citizen of the United States of America, residing at Anniston, in the county of Calhoun and State of Alabama, have invented certain new and useful Improvements in Processes for Oxidizing Phosphorus, of which the following is a specification.

This invention relates to the treatment of the gases emanating from the electric smelting of a charge of natural phosphate, siliceous flux and carbon, and has for its object the oxidation of the phosphorus evolved with such gases to phosphorus pentoxide in such manner as to conserve and make available for use the carbon monoxide gas which has been evolved from said smelting operations.

In the smelting, electrically, of a charge of natural phosphate, siliceous flux and carbon, there is evolved a vapor of elemental phosphorus and carbon monoxide gas. Heretofore in the conducting of the above smelting process for the production of phosphoric anhydride or other compounds of which phosphorus oxide is a component, the practice has been to admit sufficient air or even an excess of air, to oxidize all the carbon monoxide to carbon dioxide and all the phosphorus to phosphorus pentoxide. This oxidation of the gases is performed sometimes in the chamber above the charge, sometimes in an auxiliary combustion chamber, and sometimes partly in both.

In any event invariably in all the processes described and used heretofore, with which I am familiar, the practice is to oxidize all of the combustible gases and fumes emanating from said furnace operation.

I propose to conserve for use the heat value in the carbon monoxide gases emanating from said smelting operation and at the same time to effect the proper oxidation of the phosphorus, so that the resultant phosphorus oxides with the carbon monoxide gases may be in a treatable and collectable form for such collection procedure as may be desired.

My process is based on my discovery that, if to the gases, immediately as evolved, oxygen is admitted only in quantity sufficient to oxidize the elemental phosphorus, the phosphorus will combine with all the admitted oxygen, producing phosphorus pentoxide and leaving the carbon monoxide gases unchanged. The elemental phosphorus, taken as it emanates from the stock in an enclosed electric furnace in which a high temperature will be maintained in the combustion chamber as a result of the oxidation of the phosphorus, will have an attraction for the oxygen sufficiently greater than the carbon monoxide to cause the oxygen to first combine with the phosphorus until it is wholly converted into phosphorus pentoxide before combining, to any substantial extent, with the carbon monoxide. It follows, that by restricting the quantity of oxygen admitted, I can confine the oxidation to the phosphorus so far as is necessary for practical purposes. The oxygen should be so admitted, in relation both to the time and place of the evolution of the phosphorus from the stock, as to contact with all the phosphorus without producing zones of excess oxygen wherein any appreciable oxidation of the carbon monoxide will occur.

In practicing my invention, I conduct the smelting of a properly proportioned charge of natural phosphate, siliceous flux and carbon, in an electric furnace, so that the elemental phosphorus and carbon monoxide, as it emanates from the top surface of the charge within the furnace, will immediately pass into a combustion chamber. This combustion chamber may be formed by the space between the stock within the furnace and the roof of said furnace, or it may be an auxiliary combustion chamber constructed immediately adjacent to the furnace. I admit air continuously to the mixture of phosphorus vapor and carbon monoxide, as it emanates from the stock in said furnace, but restrict the quantity of air admitted to that which will be sufficient to oxidize the phosphorus only, thus leaving the carbon monoxide as such. I have found by actual practice on a furnace of commercial size, that if the air volume be controlled and properly admitted to the above mixture so as to distribute the air throughout the entire volume of gases, and said air be allowed to come in complete and thorough contact with said gases while the phosphorus fume is still in the infinitely finely divided state, as it emanated from the stock in said furnace, and before the particles of phosphorus fume have had time to cool and agglomerate themselves into more massive aggregates, the phosphorus in such state has so much greater attraction for, and selective action upon, the oxygen in said air than the carbon monoxide that the phosphorus will be oxidized to phosphorus pentoxide and only a negligible quantity of the carbon monoxide will be oxidized. The resultant phosphorus oxides, accompanying the carbon monoxide, may then be treated by such hydration, temperature regulation, or chemical combination with other elements, or subjected to any methods of treatment and collection desired, to separate it from the carbon monoxide and leave the cleaned and free carbon monoxide available for all uses to which it is adapted and found desirable.

What I claim as new and desire to secure by Letters Patent, is:—

1. A process consisting of electrically smelting phosphatic material with a carbonaceous reducing agent, and oxidizing only the phosphorus in the products evolved therefrom.

2. A process consisting of electrically smelting phosphatic material with a carbonaceous reducing agent, and admitting sufficient air for oxidation of only the phosphorus evolved therefrom.

3. A process consisting of electrically smelting phosphatic material with a carbonaceous reducing agent, and admitting sufficient oxygen for oxidation of only the phosphorus evolved therefrom.

4. A process consisting of electrically smelting phosphatic material with a carbonaceous reducing agent, and admitting air to the phosphorus evolved therefrom immediately after its evolution, and in quantity sufficient to oxidize the phosphorus alone.

5. A process consisting of electrically smelting phosphatic material with a carbonaceous reducing agent, and evolving vapor of phosphorus together with carbon monoxide gas, and conducting air so as to effect a thorough mixing thereof with said phosphorus vapor immediately after its evolution, the air being restricted in quantity to that sufficient to oxidize only said phosphorus without appreciable oxidation of the accompanying carbon monoxide.

6. A process consisting of electrically smelting phosphatic material with a carbonaceous reducing agent, and the oxidation of the resultant phosphorus compound in, and the separation thereof from, the accompanying carbon monoxide gases.

7. The hereindescribed process for the treatment of evolved products in an enclosed electric furnace when smelting phosphatic material with a carbonaceous reducing agent, which consists in admitting into the furnace oxygen so distributed and restricted as to volume as to oxidize only the phosphorus, and separating the oxidized phosphorus from the carbon monoxide leaving the latter available as such.

8. The hereindescribed process consisting in the smelting of phosphatic material, carbonaceous reducing agent, and silicious flux in an electric furnace, evolving elemental phosphorus and carbon monoxide, and admitting and thoroughly mixing air with said evolved products continuously, and in regulated volume sufficient to oxidize only the phosphorus therein.

9. The hereindescribed process for the selective oxidation of phosphorus in carbon monoxide gas evolved in an enclosed electric furnace, which consists in admitting oxygen continuously into and distributing it uniformly throughout the evolved products as they emerge from the stock under the high temperature maintained by the oxidation process, the quantity of oxygen being restricted to that substantially required to oxidize only the phosphorus in said products.

In testimony whereof I affix my signature.

BETHUNE G. KLUGH.

Witness:
ALMA LIDE.